US008990016B2

(12) United States Patent
Kashalkar

(10) Patent No.: US 8,990,016 B2
(45) Date of Patent: Mar. 24, 2015

(54) NAVIGATION APPARATUS, METHOD, AND PROGRAM

(75) Inventor: Sanjay Kashalkar, Munich (DE)

(73) Assignee: Aisin AW Co., Ltd., Anjo-shi (JP)

( * ) Notice: Subject to any disclaimer, the term of this patent is extended or adjusted under 35 U.S.C. 154(b) by 2053 days.

(21) Appl. No.: 11/878,089

(22) Filed: Jul. 20, 2007

(65) Prior Publication Data
US 2008/0027640 A1    Jan. 31, 2008

(30) Foreign Application Priority Data

Jul. 27, 2006  (EP) .................................... 06015713

(51) Int. Cl.
G01C 21/34    (2006.01)
G08G 1/123    (2006.01)
G01C 21/36    (2006.01)

(52) U.S. Cl.
CPC ........ G01C 21/3679 (2013.01); G01C 21/3605 (2013.01)
USPC ....... 701/533; 701/400; 701/408; 340/995.23

(58) Field of Classification Search
USPC ......... 701/200, 201, 206, 207, 208, 209, 211, 701/400, 408, 409, 414, 416, 420, 428, 438, 701/439, 465, 527, 533; 340/988, 995.19, 340/995.23, 932.2
See application file for complete search history.

(56) References Cited

U.S. PATENT DOCUMENTS

| 6,144,318 | A | * | 11/2000 | Hayashi et al. | 340/995.19 |
| 7,689,352 | B2 | * | 3/2010 | Ishizaki | 701/416 |
| 7,860,647 | B2 | * | 12/2010 | Amano | 701/414 |
| 2001/0052861 | A1 | * | 12/2001 | Ohmura et al. | 340/988 |
| 2002/0169544 | A1 | * | 11/2002 | Hashida | 701/207 |
| 2003/0074135 | A1 | * | 4/2003 | Watanabe et al. | 701/209 |
| 2004/0039520 | A1 | * | 2/2004 | Khavakh et al. | 701/201 |
| 2005/0165547 | A1 | * | 7/2005 | Uotani | 701/210 |
| 2005/0216185 | A1 | * | 9/2005 | Takezaki et al. | 701/200 |
| 2005/0240344 | A1 | * | 10/2005 | Tomita et al. | 701/211 |
| 2006/0058945 | A1 | * | 3/2006 | Watanabe | 701/200 |

(Continued)

FOREIGN PATENT DOCUMENTS

EP    1 241 650 B1    9/2002
JP    A 11-257979     9/1999

(Continued)

OTHER PUBLICATIONS

Japanese Patent Office, Notification of Reason(s) for Refusal mailed Aug. 25, 2011 in Japanese Patent Application No. 2007-184648 w/Partial English-language Translation.

Primary Examiner — Khoi Tran
Assistant Examiner — Jaime Figueroa
(74) Attorney, Agent, or Firm — Oliff PLC

(57) ABSTRACT

A navigation apparatus, method, and program store map/road data including information on parking lots, provide position information on a position of the vehicle, and output guidance information. The apparatus, method, and program process the position information and the map/road data to generate guidance information, and make a first determination whether the vehicle enters a first threshold area around a target destination. The apparatus, method, and program make, in response to the first determination, a second determination that the vehicle has not been parked before a parking notification output condition is fulfilled and output parking notification information on the output unit in response to the second determination.

17 Claims, 3 Drawing Sheets

(56) References Cited

U.S. PATENT DOCUMENTS

| | | | | |
|---|---|---|---|---|
| 2006/0149684 | A1* | 7/2006 | Matsuura et al. | 705/65 |
| 2006/0229808 | A1* | 10/2006 | Manabe | 701/210 |
| 2006/0265119 | A1* | 11/2006 | McMahan et al. | 701/209 |
| 2007/0106469 | A1* | 5/2007 | Ishizaki | 701/211 |
| 2007/0112510 | A1* | 5/2007 | Ogawa | 701/209 |
| 2008/0033640 | A1* | 2/2008 | Amano | 701/209 |
| 2009/0164119 | A1* | 6/2009 | Sakata | 701/209 |

FOREIGN PATENT DOCUMENTS

| | | |
|---|---|---|
| JP | A-2000-046574 | 2/2000 |
| JP | A 2002-243471 | 8/2002 |
| JP | A-2002-296062 | 10/2002 |
| JP | A-2002-323340 | 11/2002 |
| JP | A-2005-069733 | 3/2005 |
| JP | A 2006-058026 | 3/2006 |

\* cited by examiner though the exemplary structure of the above-described navigation apparatus may be referenced in the description, it should be appreciated that the structure is exemplary and the exemplary method need not be limited by any of the above-described exemplary structure.

NAVIGATION APPARATUS, METHOD, AND PROGRAM

INCORPORATION BY REFERENCE

This application claims priority of European Patent Application No. 06051731.8, filed Jul. 27, 2006, the disclosure of which is hereby incorporated by reference in its entirety.

BACKGROUND

1. Related Technical Fields

Related technical fields include navigation apparatuses and navigation methods that provide guidance to a vehicle user.

2. Related Art

Navigation apparatuses that provide guidance to a driver are known. In such apparatuses, the user inputs a final destination and the navigation apparatus outputs guidance information guiding the vehicle user to the final destination.

Japanese Published Patent Application No. JP A 11-257979 describes a navigation apparatus that retrieves parking lot information on parking lots near the final destination. The apparatus then chooses a parking lot according to conditions input by the user such as the cheapest parking lot.

Furthermore, Japanese Published Patent Application No. JP A 2006-58026 describes a navigation apparatus that, after the vehicle reached the final destination but continued to move around for some time, determines that the navigation guidance to the final destination is restarted.

SUMMARY

According to the above-described apparatuses, there are basically two options for inputting a final destination, namely:

a) the user must enter the specific address of the final destination, or b) the user must enter a specific parking lot somewhere near the specific address or use the option that the navigation apparatus selects a parking lot near the specific address.

Various exemplary implementations of the broad principles described herein provide an improved navigation apparatus and an improved navigation method.

Exemplary implementations provide an improved user friendly concept in situations where the user of a navigation apparatus wants to go to a specific address in an area unfamiliar to the user.

Exemplary implementations provide a navigation apparatus, method, and program that may store map/road data including information on parking lots, may provide position information on a position of the vehicle, and may output guidance information. The apparatus, method, and program may process the position information and the map/road data to generate guidance information, and may make a first determination whether the vehicle enters a first threshold area around a target destination. The apparatus, method, and program may make, in response to the first determination, a second determination that the vehicle has not been parked before a parking notification output condition is fulfilled and may output parking notification information on the output unit in response to the second determination.

BRIEF DESCRIPTION OF THE DRAWINGS

Exemplary implementations will now be described with reference to the accompanying drawings, wherein.

DETAILED DESCRIPTION OF EMBODIMENTS

Figure 1:
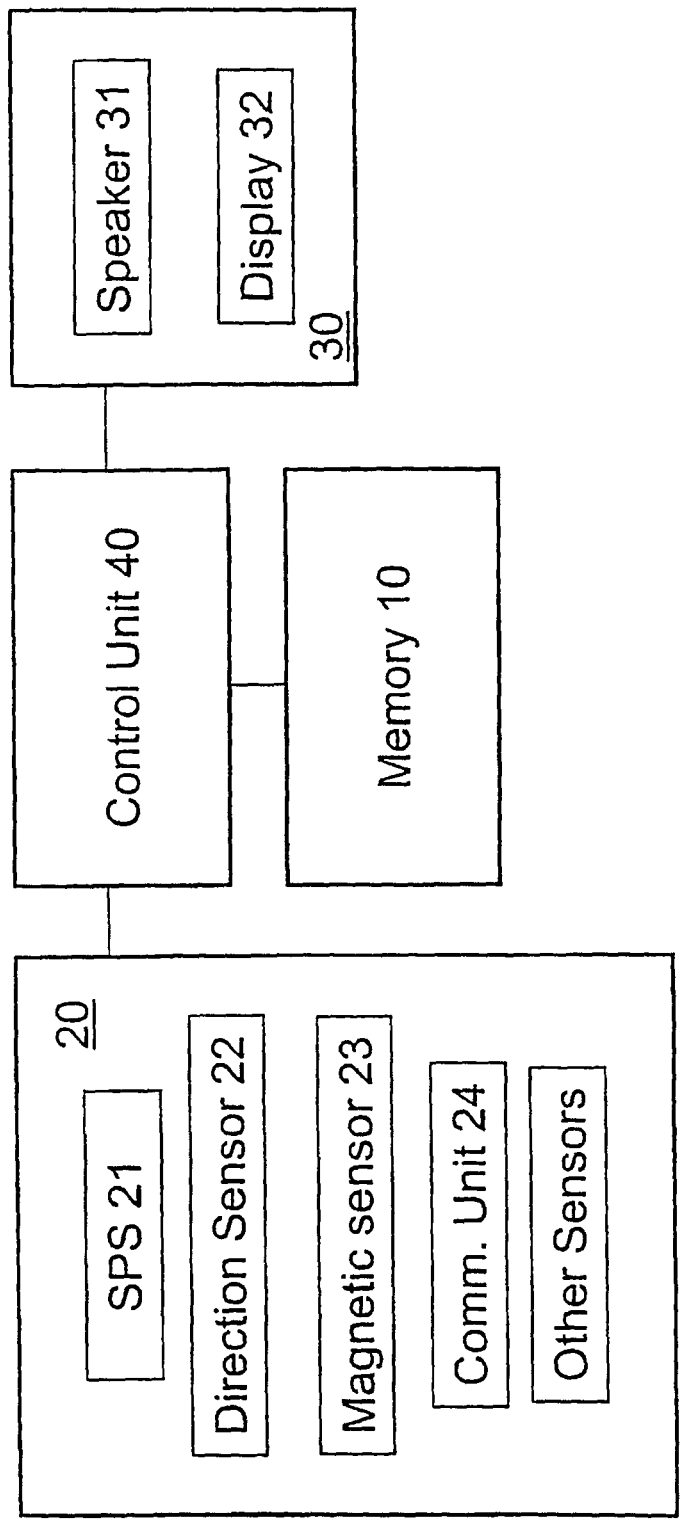
FIG. 1 is a block diagram of an exemplary navigation apparatus.

FIG. 1 shows an exemplary navigation apparatus. The navigation apparatus may include, for example, a memory 10 for storing map/road data including information on parking lots, and a sensor unit 20 including a satellite positioning system (SPS) unit 21 such as a GPS receiver. The navigation apparatus may include, for example, a direction sensor 22, a magnetic sensor 23, a communication unit 24 such as a cellular telephone unit and/or other sensors, an output unit 20 including a speaker 31 for audio output and/or a display 32 for visual output of a guidance information. The navigation apparatus may include a control unit 40 (sometimes referred to as a "controller"), for example, connected to the memory unit 10, the sensor unit 20 and the output unit 30 and adapted to control a navigation apparatus and to process the information provided/stored in the other units. Other usual units of navigation apparatus such as an input unit for input of information by a user (e.g. a touch screen, a keyboard, etc.) and the like are not shown in FIG. 1 for the sake of brevity.

Figure 2:
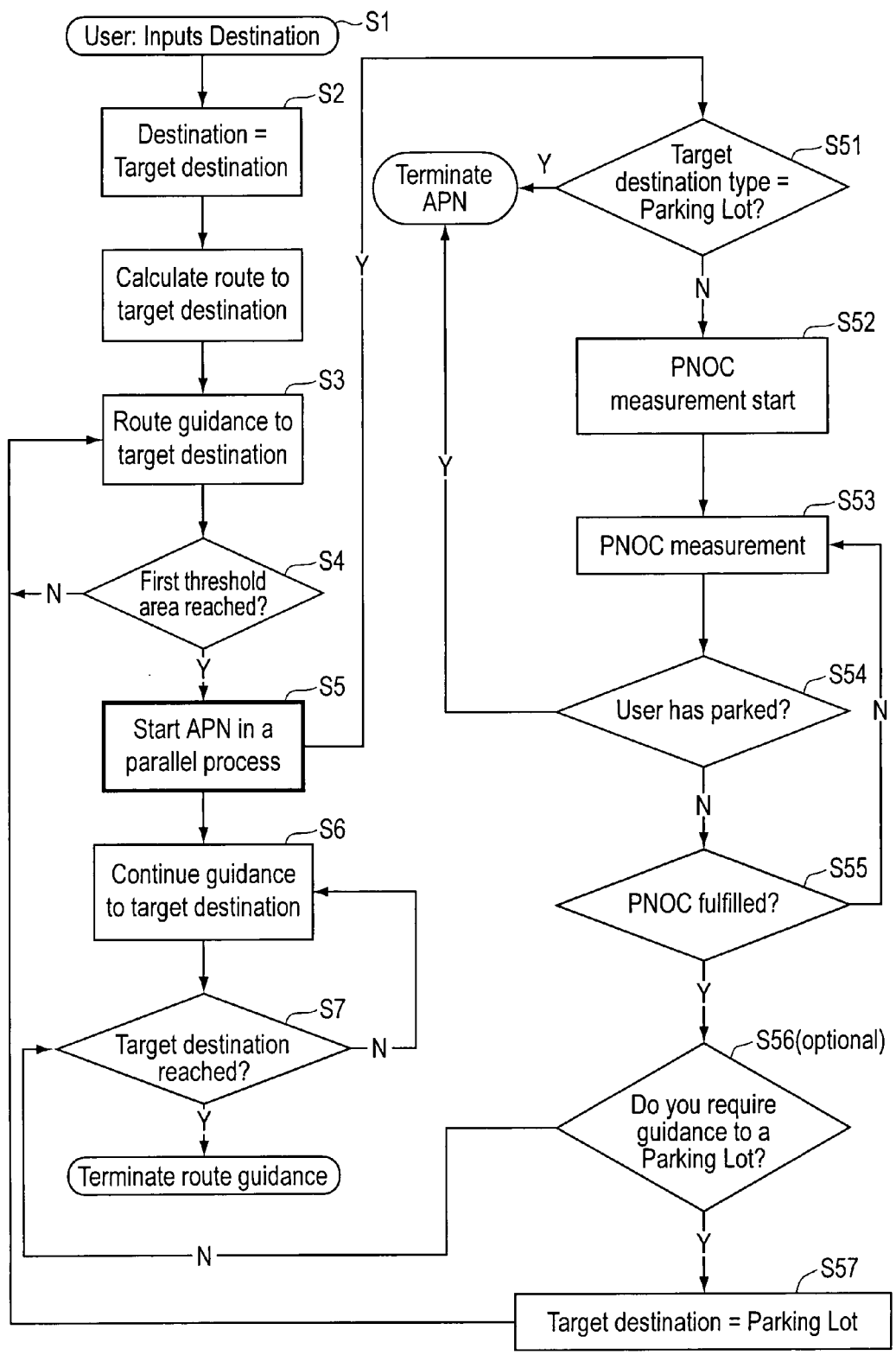
FIG. 2 is a flow chart showing an exemplary navigation method.

FIG. 2 shows an exemplary navigation method. The exemplary method may be implemented, for example, by one or more components of the above-described navigation apparatus. However, even though the exemplary structure of the above-described navigation apparatus may be referenced in the description, it should be appreciated that the structure is exemplary and the exemplary method need not be limited by any of the above-described exemplary structure.

As shown in FIG. 2, in step S1, the vehicle user inputs a destination to which the vehicle should be guided. In step S2, the destination input by the user is set as the target destination. In step S3, a route from the present vehicle position to the target destination is calculated.

In step S4, the route guidance to the destination is performed, i.e., guidance information is output to the user.

Depending on the type of the target destination, a first threshold area around the target destination is determined. If the target destination is a specific address such as Nymphenburger Strasse 53, the first threshold area may be set relatively small, such as, for example, a circle of about 300 m around the target destination. The first threshold area can be of a form other than a circle. For example, if each road, approaching the destination is marked at 300 m driving distance from the destination, then the line joining these marks will not be a circle.

If, on the other hand, the target destination is a target, which covers a relatively large area, such as the main train station in Munich, the first threshold area around the target's destination may be set relatively large, such as, for example, a circle radius of about 600 m around the target destination. Additionally, a second threshold area around the target destination may be determined, which is usually relatively small and may be used to determine whether the vehicle has reached the target destination. In case of a specific address, the second threshold area may have a radius in the range of about 10 to about 30 m.

In step S5, it is determined whether the first threshold area is reached. If the first threshold area is not yet reached (No in S5), the process flow returns to step S3 and route guidance is continued. If the first threshold area has been reached (Y in S5), i.e. if the vehicle enters the first threshold area, an automatic parking notification (APN) is started in step S6.

After start of the automatic parking notification process, for example, as a separate process (steps S51 to S57), the process flow continues to step S7, where the guidance to the target destination is continued. That means the APN process operates in the background. In step S8, it is determined whether the target destination has been reached, e.g. by using the second threshold area. If the target destination has not been reached (No in S8), the process flow returns to step S7 to continue the guidance to the target destination. In case the target destination has been reached (Yes in S7), the normal route guidance is terminated.

Whether the route guidance was terminated or continued, i.e. independent of the result of the termination in step S8, the APN process started in step S6 continues to be run in parallel (in the background).

In the APN process, it is first determined whether the type of the target destination is a parking lot. If so (Yes in S51), the APN process is terminated.

Otherwise (No in S51), measurement of a parking notification output condition (PNOC) (explained in detail below) is started in step S52.

Figure 3:
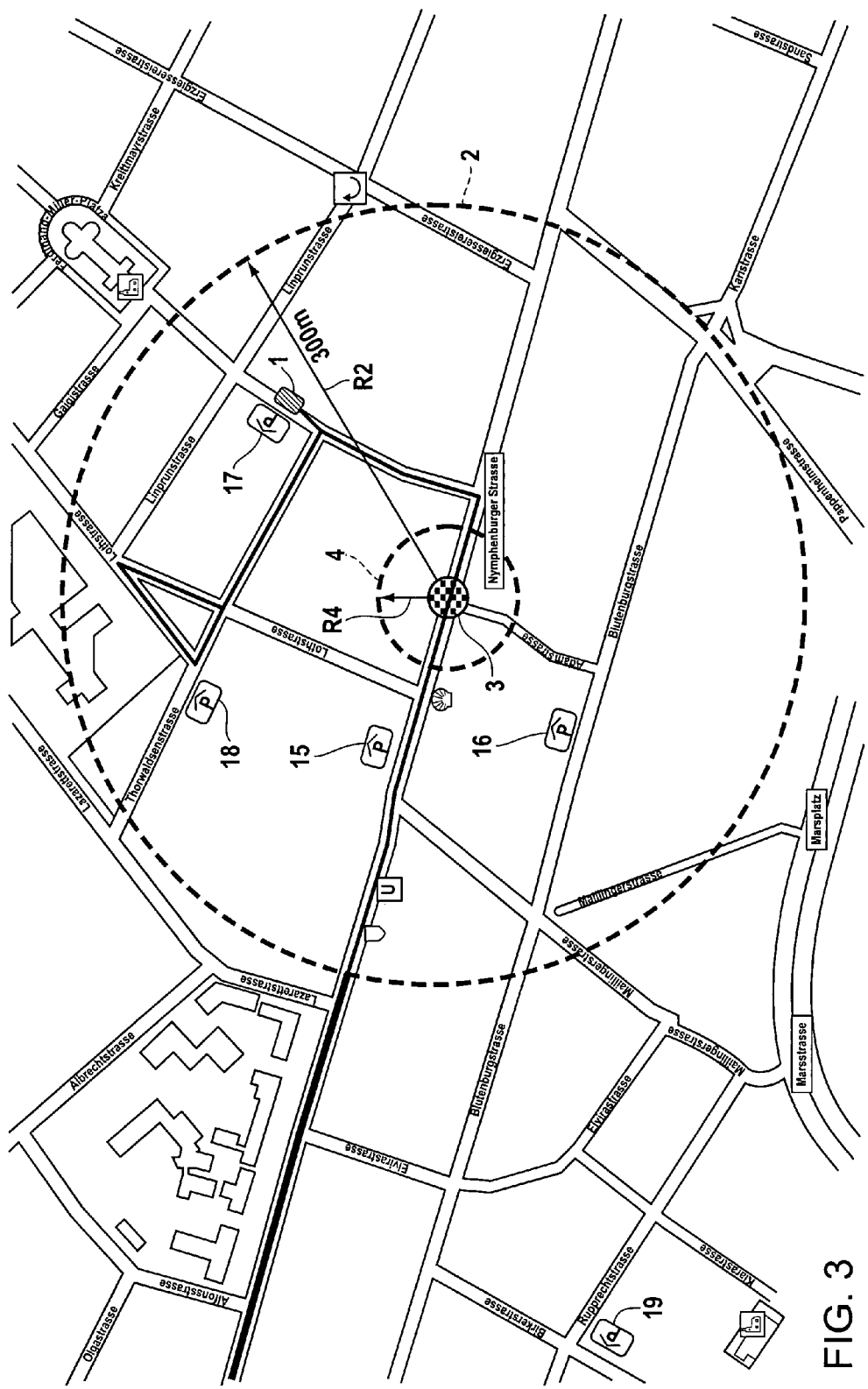
FIG. 3 is an exemplary map displaying a typical traveling path of a vehicle around a final destination.

The PNOC is explained further by an example in FIG. 3. In FIG. 3, the route of the vehicle before entering the first threshold area 2 is shown with a dark black line (coming from the left upper side in FIG. 3). When the vehicle has entered the first threshold area (Yes in S5), the vehicle continues to go on the route to the target destination 3, which in the example of FIG. 3 is the specific address Nymphenburger Strasse 53. The route of the vehicle after entering the first threshold area is shown as a grey line in FIG. 3. In the situation shown in FIG. 3, the vehicle continues on Nymphenburger Strasse and enters the second threshold area 4 with a radius R4 of 30 m. After the car enters the second threshold area 4, the route guidance is terminated (Yes in S8). In the vicinity of the destination, the user starts to look for roadside parking and turns left at the next possibility and, in a typical manner, drives through the streets around the target destination in order to find a roadside parking possibility.

The PNOC may be a specific distance traveled by the vehicle after entering the first threshold area such as, for example, 1500 m travel distance (however, any value in a range from about 100 m to about 5000 m can be determined), and/or a specific time lapsed after entering the second threshold area such as, for example, 5 min (however, any time from about 10 s to about 10 min can be determined), and/or a certain number (e.g., 1, 2, 3, . . . ) of times of entering and/or exiting the second threshold area 4 (which means that the vehicle user passes the target destination again without finding a parking place), and/or any other condition for determining, that the user did not succeed in finding a parking place within the reasonable time, distance or the like.

In step S53, the PNOC is measured. Then, in step S54, it is determined whether the vehicle has been parked. The determination of whether the vehicle has been parked can be made by specific conditions such as, for example, the engine being switched off, no movement for more than 2 min, and/or the like.

If it is determined that the vehicle is not yet parked (N in S54), it is determined, in step S55, whether the PNOC has been fulfilled. If the PNOC has not been fulfilled (No in S55), the APN returns to step S53.

If, on the other hand, it has been determined, in step S54, that the user has parked the vehicle (Yes in S54), the APN is terminated.

If it is determined, in step S55, that the PNOC has been fulfilled (Y in S55), in step S57, a parking lot (such as a parking house close to the target 3) is determined. This parking lot can be determined based on a specific condition such as distance, costs, and/or the like. These conditions may be preset by the user or by the system. In the situation shown in the example of FIG. 3, the user has set the closest parking lot, but parking lots 15 and 16, which are closer to the target destination 3 than parking lot 17, are full, which has been communicated to the navigation system via communication unit 24.

Therefore, the closest non-occupied parking lot 17 is selected, and set as the target destination. Then the process flow continues to step S4, where the route to the (new) target destination is calculated and the route guidance to the target destination is output.

Although not shown in FIG. 3, steps S5 and S6 may be skipped, e.g., by use of an APN flag.

The process flow continues in step S8 with outputting guidance to the target destination, which is parking lot 17. After the vehicle 1 reaches the target destination, as shown in FIG. 3, it is determined in step S8 that the target destination has been reached and the route guidance is terminated (again).

Optionally, the method may include step S56, which prompts the user to make an input, whether guidance to a parking lot is requested. If the user wishes guidance to a parking lot (Yes in optional S56), the process continues to step S57. Otherwise (No in S56), the process continues in step S8, if the route guidance was not yet terminated. Optionally, a restart of the route guidance as taught in Japanese Patent Application No. JP A 2006-58026 is possible.

Alternatively, the apparatus and method may not use a second threshold area. Instead, the route guidance may be stopped when the vehicle enters the first threshold area. This option may be used, for example, when target destination is a specific address and the radius R2 of the first threshold area is set to be rather small.

According to one or more of the above examples, the vehicle user will be guided to the final destination, and the navigation apparatus/method will determine that the vehicle entered a first threshold area around the target destination. If the user is able to find road side parking or another parking lot close to the specific address, the vehicle can be parked before the parking notification output condition is fulfilled.

If, however, the user does not find free road side parking or a specific parking lot near the final destination before the parking notification output condition is fulfilled, the navigation system will output parking notification information, optionally on request only, guiding the vehicle user to a parking lot near the final destination.

Accordingly, the user is not forced to select one of above described options a) and b) of the related art devices. Instead the user may first enter the target destination and search for free road side parking or a parking lot near the target destination, and if the user fails to park the car, has the option to obtain guidance to a parking lot near the final destination.

It is explicitly stated that all features disclosed in the description and/or the claims are intended to be disclosed separately and independently from each other for the purpose of original disclosure. It is explicitly stated that all value ranges or indications of groups of entities disclose every possible intermediate value or intermediate entity for the purpose of original disclosure, in particular as limits of value ranges.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation apparatus for providing guidance to a vehicle user, comprising:
    a memory that stores map/road data including information on parking lots;
    a sensor unit that provides position information on a position of the vehicle;
    an output unit that outputs guidance information; and
    a controller that:
        processes the position information and the map/road data to generate guidance information;
        makes a first determination whether the vehicle enters a first threshold area around a target destination;
        makes, in response to the first determination, a second determination that the vehicle has not been parked before a parking notification output condition is fulfilled; and
        outputs parking notification information on the output unit in response to the second determination, the parking notification information informing the driver of a location of a parking lot; and
        when a type of the target destination is a parking lot and before the vehicle enters the parking lot, terminates a process for outputting the parking notification information including the second determination,
    wherein the parking notification output condition is at least one of:
        a lapse of a time period after the vehicle enters the first threshold area;
        a traveling of a predetermined distance after the vehicle enters the first threshold area;
        a predetermined number of times of entering or exiting of a second threshold area, the second threshold area being smaller than the first threshold area; and
        entering of the first threshold area if the first threshold area is smaller than a predetermined value.

2. The apparatus of claim 1, wherein the controller:
    starts an automatic parking notification process in response to the first determination; and
    makes the second determination as part of the automatic parking notification process.

3. The apparatus of claim 2, wherein the controller provides guidance to the target destination until the parking notification output condition is fulfilled.

4. The apparatus of claim 3, wherein the controller makes a third determination whether the vehicle enters a second threshold area around the target destination, the second threshold area being smaller than the first threshold area.

5. The apparatus of claim 4, wherein the parking notification output condition is at least one of:
    a lapse of a time period after the vehicle enters the first threshold area;
    a traveling of a predetermined distance after the vehicle enters the first threshold area;
    a predetermined number of times of entering or exiting of the second threshold area; and
    entering of the first threshold area, if the first threshold area is smaller than a predetermined value.

6. The apparatus of claim 1, wherein the controller makes a third determination whether the vehicle enters a second threshold area around the target destination, the second threshold area being smaller than the first threshold area.

7. A navigation method for providing guidance to a vehicle user, comprising:
    accessing, with a processor, stored map/road data including information on parking lots;
    providing, with the processor, position information on a position of the vehicle;
    outputting, with the processor, guidance information; and
    processing, with the processor, the position information and the map/road data to generate guidance information;
    making, with the processor, a first determination whether the vehicle enters a first threshold area around a target destination;
    making, with the processor, in response to the first determination, a second determination that the vehicle has not been parked before a parking notification output condition is fulfilled; and
    outputting, with the processor, parking notification information in response to the second determination, the parking notification information informing the driver of a location of a parking lot; and
        when a type of the target destination is a parking lot and before the vehicle enters the parking lot, terminating, with the processor, a process for outputting the parking notification information including the second determination,
    wherein the parking notification output condition is at least one of:
        a lapse of a time period after the vehicle enters the first threshold area;
        a traveling of a predetermined distance after the vehicle enters the first threshold area;
        a predetermined number of times of entering or exiting of a second threshold area, the second threshold area being smaller than the first threshold area; and
        entering of the first threshold area if the first threshold area is smaller than a predetermined value.

8. The method of claim 7, further comprising:
    starting an automatic parking notification process in response to the first determination; and
    making the second determination as part of the automatic parking notification process.

9. The method of claim 8, further comprising providing guidance to the target destination until the parking notification output condition is fulfilled.

10. The method of claim 9, further comprising making a third determination whether the vehicle enters a second threshold area around the target destination, the second threshold area being smaller than the first threshold area.

11. The method of claim 10, wherein the parking notification output condition is at least one of:
    a lapse of a time period after the vehicle enters the first threshold area;
    a traveling of a predetermined distance after the vehicle enters the first threshold area;
    a predetermined number of times of entering or exiting of the second threshold area; and
    entering of the first threshold area, if the first threshold area is smaller than a predetermined value.

12. The method of claim 7, further comprising making a third determination whether the vehicle enters a second threshold area around the target destination, the second threshold area being smaller than the first threshold area.

13. A non-transitory computer-readable storage medium storing a computer program executable on a data processing device, the program comprising:
    instructions for accessing stored map/road data including information on parking lots;

instructions for providing position information on a position of the vehicle;
instructions for outputting guidance information; and
instructions for processing the position information and the map/road data to generate guidance information;
instructions for making a first determination whether the vehicle enters a first threshold area around a target destination;
instructions for making, in response to the first determination, a second determination that the vehicle has not been parked before a parking notification output condition is fulfilled; and
instructions for outputting parking notification information in response to the second determination, the parking notification information informing the driver of a location of a parking lot; and
  instructions for, when a type of the target destination is a parking lot and before the vehicle enters the parking lot, terminating a process for outputting the parking notification information including the second determination, wherein the parking notification output condition is at least one of:
   a lapse of a time period after the vehicle enters the first threshold area;
   a traveling of a predetermined distance after the vehicle enters the first threshold area;
   a predetermined number of times of entering or exiting of a second threshold area, the second threshold area being smaller than the first threshold area; and
   entering of the first threshold area if the first threshold area is smaller than a predetermined value.

14. The apparatus of claim 1, wherein the parking notification information informs the driver of a location of a parking lot that is not full.

15. The apparatus of claim 1, wherein the parking notification information is not output if the vehicle is parked.

16. The apparatus of claim 7, wherein the parking notification information informs the driver of a location of a parking lot that is not full.

17. The apparatus of claim 7, wherein the parking notification information is not output if the vehicle is parked.

* * * * *